July 16, 1940.  E. O. HIRT  2,208,512
MOUNTING FOR AUTOMOBILE RADIO CONTROLS
Filed March 30, 1936  2 Sheets-Sheet 1
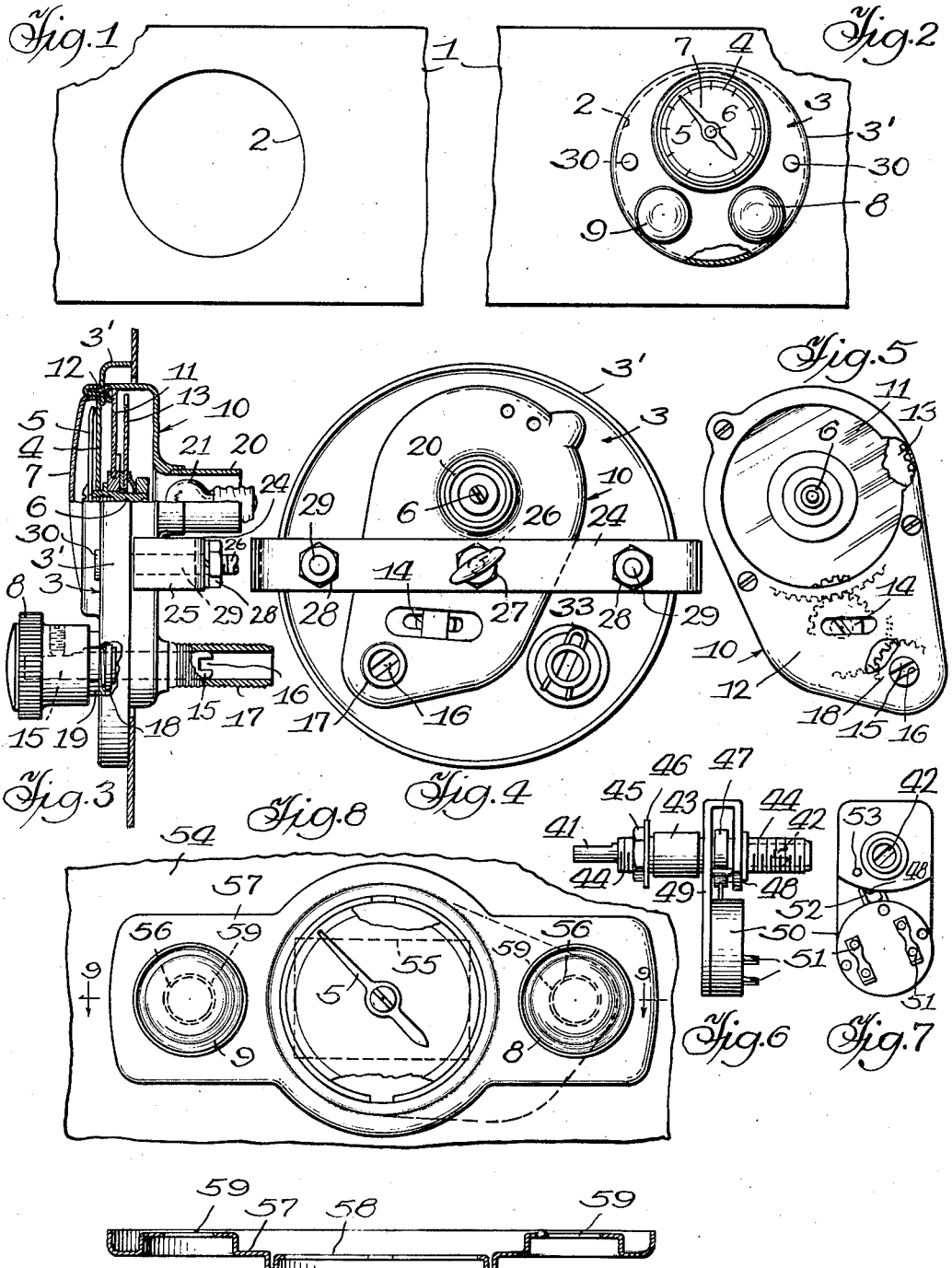
Inventor,
Edward O. Hirt,
Dyrenforth, Lee, Chritton & Wiles Attys.
Witness:
Chas. R. Koursh.

July 16, 1940.                    E. O. HIRT                    2,208,512
                    MOUNTING FOR AUTOMOBILE RADIO CONTROLS
                    Filed March 30, 1936            2 Sheets-Sheet 2
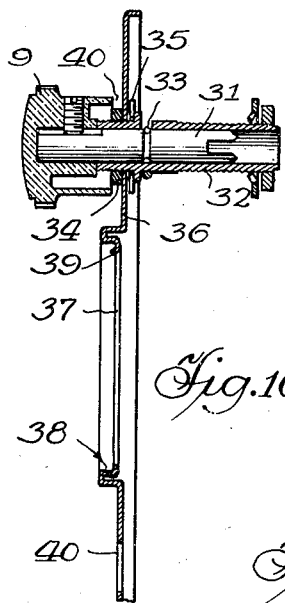
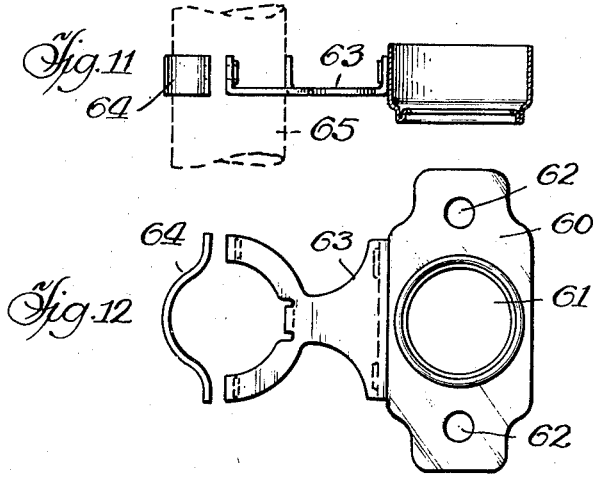
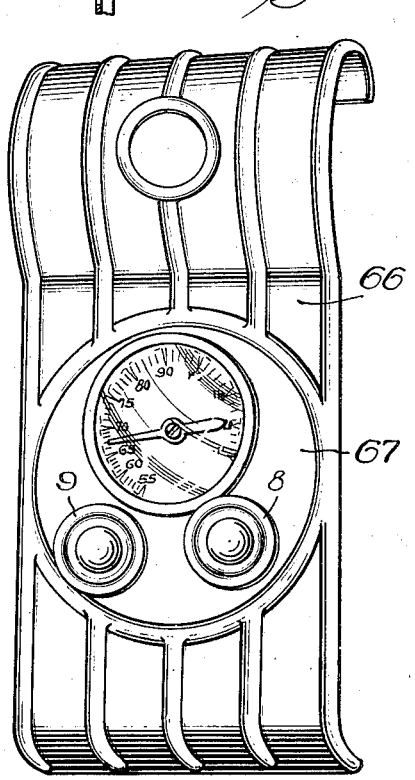
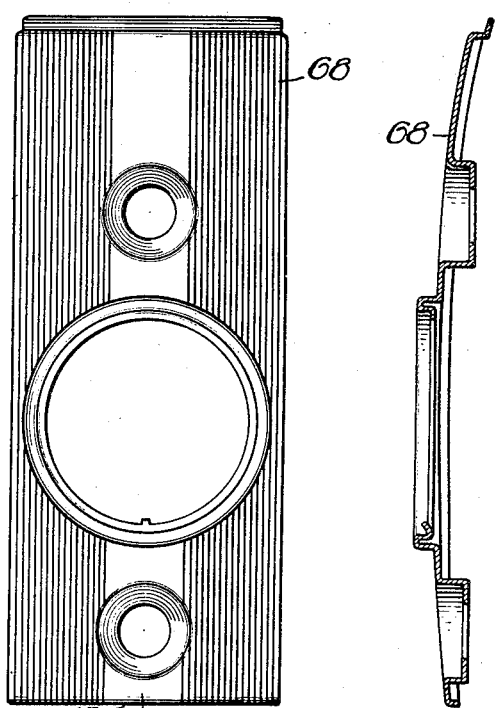
Inventor,
Edward O. Hirt,
Dyrenforth, Lee, Chritton & Wiles, Attys.

Patented July 16, 1940

2,208,512

UNITED STATES PATENT OFFICE 2,208,512

MOUNTING FOR AUTOMOBILE CONTROLS

Edward O. Hirt, Chicago, Ill., assignor to F. W. Stewart Manufacturing Company, Chicago, Ill., a corporation of Illinois Application March 30, 1936, Serial No. 71,741

16 Claims. (Cl. 250—20)

This invention relates to mountings for automobile radio controls.

The instrument panels of present day automobiles are provided with an opening or openings in which may be mounted a dial having the usual graduations and a pointer to indicate wave lengths, a rotatable knob and shaft comprising part of a remote control tuning device, and a second rotatable knob and shaft comprising a remote control volume adjuster the latter being usually combined with a switch. The radio instrument is mounted in a convenient location usually some little distance from the knob shafts, thereby necessitating intermediate connections, which, together with said knobs and shafts constitute remote controls.

The aforesaid opening or openings are of such size and arrangement as to call for a specific type or design of radio installation. If the purchaser of a new car buys the particular instrument recommended by the car manufacturers or dealers, including the remote controls, said instrument can be readily installed by the dealer or agent with a minimum of expense. If, however, the car owner prefers a radio set of some other manufacturer, the controls are not adapted to the available openings and may not present a pleasing appearance, making it necessary to enlarge or change the openings by cutting away the metal of the panel, drilling additional holes in it, etc. For example, some radio controls may be arranged on the panel with one of the two knobs on each side of the dial case or housing, in horizontal alignment; others may be arranged with the two knobs below the dial casing and spaced apart symmetrically with reference to the vertical diameter of the dial. Others may have the knobs above and below the dial in vertical alignment. Furthermore, the distance from the pointer shaft to the knob shafts is not the same in all cases although the variations usually are not very great in extent.

The tuning knob shaft must be mechanically connected to the dial pointer so that the latter will indicate the position or adjustment of the former and hence identify the station. The volume control knob shaft, in present day practice, the tuning knob and the dial, present not only a pleasing appearance but provide for convenient manipulation of the knobs or controls. In attempting to provide an equally pleasing appearance and an equally convenient location of the controls when the latter and other parts of the equipment are not the ones designed for the particular car in question, additional time, labor and expense are involved in making the installation, with the added possibility that the final result may detract from the appearance of the instrument panel.

Also, under present conditions the dealer, agent or man in the field is required to carry a large number of complete units already assembled which demands a considerable investment, in order that he may have in stock equipment adapted to fit any particular car that may be brought in.

The general object of the present invention is to provide radio controls and mounting plates therefor, so designed that a complete installation may be readily asembled on the instrument board of almost any automobile of recent design, and may present a balanced, pleasing appearance, without cutting additional holes in the instrument panel or otherwise mutilating the same. Said installation consists of: (1) a tuning unit comprising essentially a housing or a casing, a single main shaft i. e. a tuning shaft, passing therethrough, gears or other mechanical connections permitting the tuning shaft to operate the dial shaft, and a knob or other handle on the tuning shaft, outside of the housing or casing, (2) a selected mounting plate for said unit having three openings therein; and (3) a volume control shaft and knob, entirely independent of the said tuning unit except that said shaft passes through an opening in the same mounting plate as that on which said unit is mounted, the two knobs being preferably symmetrically arranged, or presenting a pleasing appearance, on said plate with respect to the dial opening. Thus these three main devices or parts may be readily assembled on various instrument boards having therein openings of various different sizes and spacing, the mounting plate serving to conceal the instrument board openings, and presenting the desired balanced pleasing appearance. In some cases where there are three openings in the instrument board or panel, i. e. a main opening or dial opening, with an opening on each side thereof for the control shafts, as for example in the case previously mentioned where all three openings are in horizontal alignment, and where the tuning unit has its dial shaft and tuning shaft spaced the same distance apart as the distance between centers of said dial opening and one of said control shaft openings, the unit and volume control shaft may be mounted on said panel without the mounting plate or cover plate.

Contributory objects are:

To provide a small number of different plates, each of a different size, shape or design, adapted to the panel board of a particular make of car and capable of being readily mounted on said panel board in such a way as to conceal the existing openings therein and at the same time permit use to be made of said openings by passing the remote control conections therethrough.

To provide a few types of plates of this character, each having an opening for the dial casing and two additional openings for the control knob shafts, said openings being arranged in horizontal alignment in one case, in vertical alignment in another case, or in a geometrical design in other cases, depending on the number of openings in the panel board behind the plate used, or the size and shape of said opening or openings.

To provide such plates with a tuning control shaft opening at the same distance from the dial casing opening in all cases, and regardless of the location of said control shaft circumferentially with respect to said dial casing, whereby a standard tuning unit, i. e. a dial shaft and tuning knob shaft mechanically connected thereto, and a housing therefor, may be used with any plate without alterations.

To provide plates of this character with the openings so positioned that the distance from the dial pointed shaft to the volume control shaft, is the same as that to the tuning control shaft, regardless of the relative arrangement of said shafts in other respects.

To provide a tuning unit and an independent volume control shaft for installation, without a cover plate, in a symmetrical or other pleasing arrangement, on an automobile instrument board or panel having three openings preformed therein, i. e. a main opening and two other properly spaced openings.

To provide a volume control shaft which is mounted independently of the tuning shaft unit although on the same supporting plate.

Various other objects and advantages will be apparent from the description which follows:

In the accompanying drawings I have shown certain commercial embodiments of the invention which will serve to illustrate the structural advantages thereof.

Fig. 1 is a front elevation of part of a panel board or instrument board of a well known make of automobile, the panel having an opening therein to receive radio controls;

Fig. 2 is a similar elevation with the radio controls of this invention mounted on an auxiliary plate or base which conceals said opening;

Fig. 3 is an enlarged side elevation, partly in section, of the device of Fig. 2;

Fig. 4 is a rear elevation of the device;

Fig. 5 is a view of the opposite or front side of what is termed herein the tuning unit, detached from the supporting plate;

Fig. 6 is a side elevation of a volume control shaft and switch;

Fig. 7 is an end elevation thereof;

Fig. 8 is a front elevation of a control unit for a different make of car;

Fig. 9 is a section of the supporting plate only on the line 9—9 of Fig. 6;

Fig. 10 is a section of another supporting plate with a volume control shaft mounted therein and shown also in section;

Fig. 11 is an end view, partly in section, and inverted, of a further form of control unit adapted for mounting on an automobile steering post;

Fig. 12 is a bottom view thereof;

Fig. 13 is a perspective view of another modification of the plate;

Fig. 14 is an elevation of a further form of plate;

Fig. 15 is a section thereof on the line 15—15 of Fig. 14.

In Fig. 1, part of the panel 1 of a Ford automobile is shown. This panel is now made as a metal plate having a circular opening 2 therein which hole is concealed ordinarily by a cover plate, or which may have an ash tray mounted therein with a concealing cover. Where a control unit of a type recommended for this particular car was installed, after removing the concealing cover and whatever other device obstructed the opening, said unit comprised a housing having a dial visible through an opening in the housing, a tuning knob projecting from the housing and a volume control knob also projecting from the housing. In such a unit, the two knobs are positioned on the ends of corresponding shafts which are mounted in the unit and are necessarily a fixed distance apart and a fixed distance from the axis of the shaft on which the dial pointer is mounted. There is no way to change the relative location of the three shafts which constitute part of this unit and as long as said unit was mounted in the car for which it was intended no changes or alterations were required.

In installing the device of the present invention, the temporary cover is removed as before and there is substituted therefor a device comprising, in the illustrative embodiment of Fig. 1 a circular cover plate or base 3 with an annular flange 3' of a diameter slightly larger than the opening 2 whereby the flange may be held against the panel with the cover or base plate as a whole, concealing the opening in said panel. The hollow cover plate or flanged base has an opening with a dial plate 4 mounted therein, the numbers thereon representing wave lengths or stations. There is also provided the usual pointer 5 which is mounted on the end of a short dial shaft 6, which shaft projects from the unit in which it is mounted and passes through a central opening in said dial plate. The dial may be protected by a transparent cover or crystal 7, shown in Fig. 3. The tuning knob 8 and its shaft, as hereinafter described, are connected by mechanical means to the dial shaft 6, these mechanical connections or reduction gearing between the two shafts and certain other parts, together with the housing therefor, comprising a tuning unit. This unit, as later explained, is a substantially complete structure, which is clamped to the rear of and supported by the base or cover plate, which latter has another hole therethrough to receive the independent volume control shaft with its actuating knob 9. This knob may also actuate a switch in a manner well understood. It will be seen from Fig. 2 that the two control knobs are arranged below the dial and symmetrically with respect to the vertical diameter or axis of said dial whereby a balanced and pleasing appearance is presented.

The said tuning unit, represented as a whole by reference 10 is shown on a larger scale in Figs. 3, 4 and 5. It consists of a housing which may be made of aluminum, for example, and it has an opening in the front which is circular in this instance and is closed by a transparent disc 11 clamped under a removable, apertured cover 12. A large transparent gear 13 is mounted on the short shaft 6 on one side of the transparent disc 11, the pointer 5 being mounted on the other end of said shaft. The shaft itself is mounted in an opening in the transparent disc 11 by means of a bushing and suitable washers, as shown in Fig. 3 in half section. The pointer 5 is mounted on one end of said shaft by a short screw. Thus the shaft, the pointer thereon at one end and the transparent gear 13 are all supported by the transparent disc 11. Other gears mounted on shafts 14 and 15 complete the train of reduction gears whereby rotation of the shaft 15, which is the tuning shaft, by means of the knob 8 thereon (see Fig. 3) will turn the dial pointer. The inner end of said tuning shaft has a slot 16 to couple it to the radio instrument itself, by means of a flexible shaft, not shown. Said radio instrument is usually mounted a short distance away, in a convenient location in the car. The tuning shaft is rotatably mounted within a tubular extension 17 on the rear of the unit housing, said extension being threaded to receive a nut. A threaded ring 18 also surrounds said shaft, projects through an opening in the cover 12 and is held thereto by a nut 19, shown in Fig. 3. The knob 8 is mounted on one end of the shaft 15 in non-rotatable relation thereto, in any suitable manner.

The rear of the casing 10 has a hollow boss or extension 20 thereon, preferably integral with the casing and in alignment with the dial shaft 6. This hollow boss is intended to receive an incandescent lamp 21 (shown in Fig. 3) the light from which passes through the transparent gear 13 and transparent dial 11, and illuminates the rear of the dial plate. The housing 10 is preferably detachably clamped to the plate 3 and its position thereon is determined by the location of the large opening in said plate with reference to one of the two smaller openings through which the tuning shaft 15 passes. The axis of said shaft 15, as shown in Fig. 5, is, of course, a fixed distance from the axis of the dial shaft 6, and the latter shaft is rotated by manual adjustment of the former. Therefore, the opening in the plate 3, to receive the shaft 15, may be located anywhere about the axis of the shaft 6 as a center, within, of course, the physical confines of the plate 3 and flange 3'. In the case selected for illustration, the relative arrangement of the housing unit 10 with respect to the flanged plate 3 is as shown in Fig. 4, said unit being clamped against the plate by a clamping bar 24 having its ends 25 bent at right angles, as shown in Fig. 3, said bar, therefore, being in a sense U shaped. Said bar carries a screw 26 which passes through a screw threaded opening therein near the middle thereof and is adapted to be locked by a nut 27. The bar is restrained from movement away from the flanged plate 3, by means of nuts 28 on the screws 29. Said screws have their unthreaded ends mounted in the plate with the extremities headed over or riveted at 30, as shown in Figs. 2 and 3, the threaded ends extending through openings in said clamping bar, which bar overlies the unit 10, with a clearance between the two. The right angled extensions or legs 25 of the clamping bar abut against the rear side of the panel 1, and, as the nuts 29 are tightened, the flanged plate 3 is drawn snugly against the front surface of said panel and the legs of the clamping bar are clamped against the rear surface of said panel, thus holding said plate in position. The unit 10 is prevented from sliding over the inner surface of said flanged plate, by the tuning shaft 15, threaded ring 18 and nut 19 as well as by the dial shaft 6 which is confined in the center opening of the dial plate.

The end of the screw 26 bears against the housing of the unit 10 and when said screw is turned it tends to press said housing against the rear of the flanged plate and to press the clamping bar away from said housing, against the restraining action of the nuts 28 on the threaded rivets or screws 29. Thus the same clamping bar performs the double function of clamping the housing against the flanged plate and of clamping said flanged plate to the supporting panel. However, separate clamping means may be employed, as will be apparent. The volume control knob 9 and its corresponding shaft is entirely independent of the tuning control knob 8 and its associated remote control parts. The knob 9 is, however, mounted in an opening in the plate 3, which opening is symmetrically positioned with reference to the other openings.

In the form thus far described, the plate or base 3 is of circular form and is intended to overlie and conceal the circular opening 2 in the panel board. However, even if said panel board opening were some other shape, i. e. square, oblong or rectangular in form, the same circular disc, if large enough, could be used to conceal said opening. In other words, there is no relation necessarily between the shape of the supporting plate and the shape of the opening which it covers. Some automobile panels have a vertically arranged oblong opening or a large opening accompanied by one or more small openings; other panels may have a horizontally arranged opening or a square opening with or without other openings. The devices of my invention afford very flexible units which may be applied to almost any standard panel inasmuch as the tuning unit may be mounted in any position with respect to its supporting plate that may be necessary or convenient in positioning the tuning unit housing so that it can be accommodated to the openings in the panel. The remaining opening in the supporting plate, i. e. the one to receive the remote control shaft, may be located in any position which will give a pleasing appearance with respect to the other two openings for the reason that the volume control shaft, as stated, is independent of the tuning control housing or unit.

The volume control shaft is, in general, similar to the tuning control shaft. The associated parts, whereby it may be readily mounted in an opening in any one of a number of different supporting plates, are shown more clearly in Fig. 10 in which said shaft 31 is mounted within a hollow extension 32, the latter being cut out on one side to receive a wire-retaining clip 33. This tubular member 32 has screw threads on each end thereof with a locking nut 34 and a locking washer 35 arranged on opposite sides of the supporting plate 36 for clamping the device to said plate. The knob 9, the same as the one shown in Fig. 2, may be held to the flat end of the shaft by a set screw, as in the case of the tuning shaft knob 8.

It will be understood that the volume control shaft just described may be considered as the one used with the circular supporting plate shown in Figs. 2, 4 and 5, although in Fig. 10 the plate 36 in which it is mounted is intended to illustrate a modified form of plate, i. e. a rectangular plate with a large opening 37 for the dial parts, as before, the opening being surrounded by an annular flange and having an undercut annular recess 38, and a spring locking clip 39 to prevent rotation of the dial itself. Similar details are provided in connection with the dial of Figs. 2 and 3 also. On opposite sides of the large opening are two smaller openings, 40—40, in one of which the volume shaft is shown mounted, as just described. The other opening is intended to receive the tuning shaft and accessories, as described in connection with Fig. 3. The distance from the center of the large opening 37 to the center of the small opening 40, just described, the same as in the device of Figs. 2-5 inclusive so that a tuning unit identical with the one shown therein may readily be mounted on this plate 36, which is the plate intended for the Plymouth car. It will be noted that the three openings are in alignment, which brings the two tuning knobs on opposite sides of the dial as distinguished from the Ford mounting of Fig. 2 in which the centers of the two knobs and the dial have a triangular spacing. Although the volume control knob of Fig. 10 is spaced the same distance from the dial plate as is the tuning control knob, to present a symmetrical arrangement, it will be seen that the volume control knob and shaft are not part of the tuning control unit but are independent thereof.

The volume control shaft may also be equipped with a switch, if desired. One form of switch and the mounting therefor is shown in Figs. 6 and 7, in which the volume control shaft 41 may be substituted for the one shown in Figs. 2, 4 and 5, if desired. Said shaft 41 has its inner end slotted at 42, as in the other cases illustrated, and passes through a cylindrical housing 43 and having a reduced threaded extension 44 with a nut 45 and spring washer 46 thereon to clamp the device onto the supporting plate. Said shaft also has a collar 47 thereon which rotates therewith and has a radial arm 48 which may be oscillated back and forth within a housing formed from a bent plate 49, on one end of which is mounted a suitable block of insulating material 50 with circuit contacts 51 thereon. The circuit is opened and closed with a snap action by throwing back and forth a pivoted forked member 52 mounted in the base 50 and actuated by the projecting arm 48. The throw of said arm in one direction is limited by a pin 53, otherwise it may rotate nearly a complete turn and thus permit the shaft to effect the necessary volume control. The usual control knob is, of course, mounted on one end of said control shaft although not shown in these two figures.

Fig. 8 represents a panel board and control plate of a different make of car, as, for example, the Chevrolet. The panel board 54, only part of which is shown, may be assumed to have, in this case, an oblong opening 55 with a round opening 56 on each side of it. The cover plate 57 is therefore formed as shown, see more particularly Fig. 9, with a large central opening 58 and two smaller openings 59 arranged in horizontal alignment on each side of the larger opening. The unit is between the panel and the plate and is indicated in dotted lines. It will be seen that the cover plate, with the usual dial and knobs mounted thereon, presents a symmetrical arrangement and conceals the panel board openings. Although the drawings of all the figures herein are not on the same scale, it is to be understood that the same identical control unit is intended to be used in any of the plates, the dial opening being the same in all cases and the distance from the dial center to the axis of the tuning control knob being the same in all cases. Preferably also the distance from the dial center to the axis of the volume control knob is the same in all cases although there are no mechanical reasons requiring this symmetry.

In Figs. 11 and 12 the housing 60, with its dial opening 61 and tuning shaft openings 62 are mounted on the steering post instead of the panel board of the car, to illustrate further the range of adaptability of the devices described herein. A two-part bracket 63, 64, permits the device to be clamped around the steering post 65, or, with a change of brackets, it may be clamped to or mounted on any desired part of the car.

Fig. 13 shows a perspective view of a further modified form of plate 66 with ornamental ribs thereon and curved at the top and bottom in accordance with the requirements of a particular panel board, said plate having the two knobs and the dial arranged in a symmetrical group on the circular background 67 formed on said plate.

Figs. 14 and 15 show an elevation and a section respectively, of another ornamental form of plate 68 which is curved, as shown in Fig. 15, and has its three openings arranged in vertical alignment.

The different forms of bases or cover plates described herein are, of course, illustrative of a few only of the many applications of the unit feature for mounting radio controls wherever desired, but more particularly in some accessible part of an automobile. Referring to the particular illustrations described herein, the unit may be otherwise arranged with reference to its cover plate, and said unit may be clamped thereto in various ways and said cover plate mounted on the instrument board in various ways. The screw threads on the exterior of the tubular members, in which the slotted ends of the shafts are mounted, are intended to receive nuts to clamp the supporting plate and the parts carried thereby, to the instrument panel. Since said control shafts have to pass through or align with the openings in the instrument panel in any case (or through one large opening therein) it is a simple matter to clamp the device to the instrument panel by means of the nuts just referred to.

I claim:

1. An attachment for an automobile instrument panel having an opening therein, comprising a radio control mounting plate secured to said panel and having two openings therein, a dial positioned adjacent and in registration with one of said two openings, a self contained, control unit received within said panel opening and comprising a supporting structure having a transparent panel, a source of light behind said panel, a dial shaft rotatably mounted in an opening in said transparent panel, passing through said dial and having a dial pointer thereon, said structure also having a tuning shaft mounted thereon, mechanically connected to said first shaft, and passing through a second opening, said unit being mounted on said mounting plate and supported wholly thereby.

2. As a new article of manufacture, a portable radio control mounting plate having an opening therein, a hollow member passing through said opening with a shoulder on one side of said plate, means on the other side of said plate for clamping said member thereto, said member having a slot therein, a volume control shaft passing through said member and rotatable therein, and a locking device in said slot engaging said shaft to prevent longitudinal movement thereof, said member being exteriorly screw threaded whereby it may pass through an opening in an automobile panel and be adjustably clamped thereto with said control shaft accessible from the opposite side of said panel.

3. As a new article of manufacture, a radio control mounting plate having three openings therein, a radio tuning unit secured to the rear of said plate, extending from one of said openings to another and comprising a self-contained entity having a tuning shaft, a station dial in one openings, said tuning shaft being positioned in another opening, a volume control shaft in the third opening, and independent mechanically of said unit, projecting tubular members surrounding said shafts and means for securing said tubular members to a support through an opening therein.

4. A tuning unit comprising a housing having a semi-circular portion at one end with a transparent cover plate, a source of light behind said cover plate, an actuating shaft at the other end of said unit, a rotatable shaft mounted in said transparent cover plate, and a train of gears between said shafts, said housing having walls converging from the semi-circular end portion to the other end.

5. A tuning unit comprising a housing having a semi-circular portion at one end with a transparent cover, an actuating shaft at the other end, a rotatable shaft passing through said transparent cover, a train of gears between said shafts, one of said gears being transparent and a projecting boss on said housing to the rear of said transparent cover and transparent gear to receive an incandescent lamp.

6. A tuning unit having an indicator shaft and a tuning shaft, a third or volume control shaft for assembly therewith, the said shafts projecting in parallel relation in the same direction, in combination with a plate having three openings, the openings being so located relatively that with a given distance between the shaft centers of the tuning unit, the latter may be adjustably positioned rotatively about the indicator shaft axis relatively to the outline of the plate so that the tuning shaft may align with and enter its opening in said plate at a predetermined location relatively to the third opening, said third opening serving to mount and position said volume control shaft.

7. A tuning unit having an indicator shaft and a tuning shaft, a third or volume control shaft for assembly therewith, the said shafts projecting in parallel relation in the same direction, in combination with a plate having three openings one of which is an indicator dial opening, the openings being so located relatively that with a given distance between the shaft centers of the tuning unit, the latter may be adjustably positioned rotatively about the indicator shaft axis relatively to the outline of the plate so that the indicator opening is concentric with respect to said indicator axis, and so that the tuning shaft may align with and enter its opening in said plate at a predetermined location relatively to the third opening, said third opening receiving said volume control shaft.

8. Radio control equipment comprising a self-contained unit for tuning purposes only, an independent volume control shaft, and a mounting plate therefor of variable size and shape having three openings therein, said openings sustaining among themselves and toward said variably shaped plate a prearranged relation, two of said openings being separated a fixed distance and the third opening being variably disposed with respect to said two openings, whereby said tuning unit may be mounted adjacent the plate to utilize said two openings regardless of said relation, and said independent shaft may utilize the third opening.

9. A radio remote control having a casing with a lamp disposed therein, a transparent gear disposed in advance of said lamp, a translucent dial disposed in alignment with said gear and a pointer working over said dial.

10. In a remote control, a unit, indicating means carried by said unit, means for rotating the same including a transparent gear, a source of light behind the gear and a member through which light may pass supporting the gear, and indicating means whereby the light may pass from the source through to the indicating means to allow the operator to adjust the apparatus, a shaft carried by the unit and means driving the transparent gear from the shaft.

11. In a remote control, a unit, indicating means carried by said unit, means for rotating said indicating means including a transparent gear, a source of light behind said gear, and a member through which light may pass, supporting said gear, whereby the light may pass from the source through to said indicating means to illuminate the latter.

12. A universal remote control for an automobile radio receiver comprising a casing adapted to be disposed to the rear of the instrument board of the automobile, a revoluble shaft mounted in said casing having a flexible cable extending to the radio receiver, a pointer and a dial disposed on the face of said instrument board, means for operating said pointer from said revoluble shaft, an escutcheon plate disposed on the face of said instrument board having an opening to receive said dial and pointer, and means passing through said escutcheon plate and instrument board and engaging part of said casing for fastening said escutcheon plate and casing in position on said instrument board.

13. A remote control for an automobile radio receiver comprising a casing adapted to be disposed adjacent an opening in the instrument panel of the automobile, said casing being provided with revoluble shafts one of which operates a controlling member of the radio receiver, an escutcheon plate disposed on the face of the panel over said opening, a crystal disposed in said escutcheon plate, a dial carried by said casing in alignment with said crystal, a pointer shaft revolubly mounted in said casing carrying a pointer working over said dial, a transparent gear disposed on said pointer shaft to the rear of said dial, an electric lamp disposed in said casing to the rear of said transparent gear, an idle gear meshing with said transparent gear and a gear carried by one of said revoluble shafts meshing with the last mentioned gear for revolving said pointer shaft.

14. A universal remote control for automobile radio sets comprising a casing adapted to be disposed on an instrument panel of an automobile, a ring adapted to be disposed on one side of said panel and a dial disposed in said ring, a pointer shaft extending through said dial having a pointer, and an escutcheon plate provided with an opening in alignment with said dial, and having a flange surrounding the same, a crystal arranged over said dial and held in position thereon by said flange, and members passing through said escutcheon plate and panel for clamping said casing to said panel.

15. A tuning unit having an indicator shaft and a tuning shaft, a station indicator on said shaft, a transparent gear also on said shaft behind said indicator, a gear on said tuning shaft to rotate said transparent gear, and an incandescent lamp behind said transparent gear to render said station indicator visible, a third or volume control shaft for assembly with said unit, the said shafts projecting in parallel relation in the same direction, in combination with a plate having three openings, the openings being so located relatively that with a given distance between the shaft centers of the tuning unit, the latter may be adjustably positioned rotatively about the indicator shaft axis relatively to the outline of the plate so that the tuning shaft may align with and enter its opening in said plate at a predetermined location relatively to the third opening, said third opening serving to mount and position said volume control shaft.

16. A tuning unit having an indicator shaft and a tuning shaft, a third or volume control shaft for assembly therewith, the said shaft projecting in parallel relation in the same direction, in combination with a plate having three openings, the openings being so located relatively that with a given distance between the shaft centers of the tuning unit, the latter may be adjustably positioned rotatively about the indicator shaft axis relatively to the outline of the plate so that the tuning shaft may align with and enter its opening in said plate at a predetermined location relatively to the third opening, said third opening serving to mount and position said volume control shaft, and means for detachably securing said unit to the rear of said plate.

EDWARD O. HIRT.